US006591255B1

United States Patent
Tatum et al.

(10) Patent No.: US 6,591,255 B1
(45) Date of Patent: Jul. 8, 2003

(54) AUTOMATIC DATA EXTRACTION, ERROR CORRECTION AND FORECASTING SYSTEM

(75) Inventors: John T. Tatum, Alpharetta, GA (US); W. Clayton Wilkinson, IV, Alpharetta, GA (US); Robert J. Jannarone, Atlanta, GA (US)

(73) Assignee: Netuitive, Inc., Alpharetta, GA (US)

( * ) Notice: Subject to any disclaimer, the term of this patent is extended or adjusted under 35 U.S.C. 154(b) by 0 days.

(21) Appl. No.: 09/543,697

(22) Filed: Apr. 5, 2000

Related U.S. Application Data (60) Provisional application No. 60/127,760, filed on Apr. 5, 1999.

(51) Int. Cl.[7] .............................................. G06F 15/18
(52) U.S. Cl. ........................................ 706/25; 706/21
(58) Field of Search ..................................... 706/25, 21

(56) References Cited

U.S. PATENT DOCUMENTS 5,835,902 A    11/1998  Jannarone ................... 706/26

5,910,987 A  *  6/1999  Ginter et al. ................. 380/24
6,327,677 B1    12/2001 Garg et al. .................... 714/37

\* cited by examiner

*Primary Examiner*—George B. Davis
(74) *Attorney, Agent, or Firm*—Michael J. Mehrman; Mehrman Law Office PC (57) ABSTRACT

A "Rapid Learner Client Service" (RLCS) system that allows a large number of end-users to obtain the benefits of a sophisticated neural-network forecasting system. Rather than purchasing or developing a forecasting system of their own, RLCS clients subscribe to a forecasting service performed by forecasting equipment located at a remote site. This allows a single highly sophisticated forecasting system to meet the forecasting needs of a large number of subscribers. This forecasting service is performed by an RLCS server that periodically and automatically accesses the subscriber's computer to obtain a fresh set of input data. Alternatively, the subscriber's computer may contact the RLCS server to initiate the process. This input data is then downloaded to the RLCS server, where it is checked and corrected for errors by imputing values for missing or deviant input values. The error-corrected input data is then used to compute a forecast of output values, which are downloaded to the client's computer. The RLCS server also computes and downloads a set accuracy statistics for the client's review.

12 Claims, 2 Drawing Sheets

AUTOMATIC DATA EXTRACTION, ERROR CORRECTION AND FORECASTING SYSTEM

REFERENCE TO RELATED APPLICATION

This application claims priority to U.S. Provisional Application No. 60/127,760 filed Apr. 5, 1999 entitled "Automatic Data Extraction, Error Correction And Forecasting System."

TECHNICAL FIELD

This invention relates to computer-based forecasting systems and, more particularly, relates to a neural-network forecasting system that automatically extracts input data over the Internet, corrects the input data for errors, forecasts output values based on the corrected input data, and returns the forecast over the Internet. In particular, the system may be used to automatically extract weather forecast input data and return electricity demand output values.

BACKGROUND OF THE INVENTION

Many occupations can benefit from the availability of reliable and accurate forecasts of various types. For example, electric utilities can use electricity demand forecasts to schedule the operation of electric power plants, commodity traders can use commodity price forecasts to buy and sell commodity future contracts, municipal governments can use weather forecasts to schedule snow plows, hospitals can use patient forecasts to schedule medical personnel, manufactures can use product demand forecasts to schedule the purchase of raw materials, and so forth.

However, reliable and accurate forecasts can be difficult and expensive to obtain. The timeliness of the forecast is often a critical element. Once new input data becomes available, processing that data to obtain an updated forecast of important values in a timely manner may be imperative. For certain critical applications, such as weather and electricity demand forecasting, very expensive and sophisticated forecasting systems have been developed. For example, some of the most powerful, expensive, and sophisticated computers in the world are dedicated to the task of weather forecasting. In some cases, more than twenty hours of computing are required to produce a five-day weather forecast for the continental United States. In addition, sophisticated neural-network parallel processing hardware and software has been developed to forecast electricity demand based on weather forecasts and other information. Obviously, every entity that could benefit from reliable and accurate forecasts cannot afford these types of expensive forecasting systems.

In recent years, utility regulators in the United States have decreased price regulation and increased the numbers and types of electricity and gas services that are open for competitive bidding. The basic idea is to allow the market forces of supply and demand determine the cost to the end-user for these utility services. A similar type of government-sponsored price deregulation reshaped the airline, trucking, and telephone industries in previous decades. A practical result of this trend toward deregulation is to place the purchasing decisions for basic utility services out of the hands of regulated utilities and into the hands of competitive suppliers and the end-users that they serve.

This has proliferated the number and types of utility service options available for end users, such as industries, farms, co-operatives, municipalities, and the like. To plan their operations and make informed purchasing decisions, individual and groups of utility suppliers and end users have an increased need for reliable and accurate forecasts of their own utility needs. Increased competition in electricity procurement thus provides both suppliers and purchasers of electricity with increased opportunities to use electricity forecasts in their day-to-day operation.

Similar competitive forces are also increasing the need for forecasts by natural gas, telephone, computer service, and other utilities and their customers. Indeed, the availability or reliable and accurate forecasts of critical information can improve the efficiency and profitability of a very wide variety of activities. Although the preceding discussion focuses on the impact of deregulation on utility purchasing, entities involved in a wide range of activities have a similar need for reliable and accurate forecasts. For example, agricultural production from seed to shelf involves the use of forecasts to predict supply and demand for all sorts commodities. The manufacture of goods also involves the use of forecasts to predict the supply and demand for all sorts goods. Real estate development, health care, banking, personal investing, and many other occupations also use forecasts in some aspect of their operations.

In many cases, access to reliable and accurate forecasts may determine the profitability and ultimate viability of individual participants in these markets. The unfortunate truth is that the playing field may be far from level. Large entities with expensive and sophisticated forecasting systems may often have the important advantage of timely, reliable and accurate forecasts to guide their decisions. Smaller entities, who rely on older and less accurate information, may not be able to compete effectively simply because they cannot afford to purchase or develop sophisticated forecasting systems.

Thus, there is a general need in the art for a cost-effective mechanism for providing interested parties with the benefits of sophisticated forecasting systems. There is a further need for improved systems for generating and delivering timely, reliable and accurate forecasts for a wide range of applications.

SUMMARY OF THE INVENTION

The present invention meets the needs described above in a business process and computer system known as the "Rapid Learner Client Service" (RLCS) system. This system allows a large number of end-users to obtain the benefits of a sophisticated neural-network forecasting system. Rather than purchasing or developing a forecasting system of their own, RLCS clients subscribe to a forecasting service performed by forecasting equipment located at a remote site. This allows a single highly sophisticated forecasting system to meet the forecasting needs of a large number of subscribers.

This forecasting service is performed by an RLCS server that periodically and automatically accesses the subscriber's computer to obtain a fresh set of input data. This input data is then downloaded to the RLCS server, where it is checked and corrected for errors by imputing values for missing or deviant input values. Alternatively, the subscriber's computer may contact the RLCS server to initiate the process. The error-corrected input data is then used to compute a forecast of output values, which are downloaded to the client's computer. The RLCS server also computes and downloads a set accuracy statistics for the client's review.

In an electricity demand forecasting application, for example, the input data downloaded or received from the client's computer may include weather forecast data and the client's actual electricity demand and weather data for a recent historical period. The RLCS server then uses this input data to compute an electricity demand forecast for a projected period, which is returned to the client's computer. This process is typically repeated hourly or daily, depending on the client's needs. However, the process could be repeated at different intervals and for different applications based on the needs of different clients. It should be understood, therefore, that the invention is generally applicable as a business method and computer-based forecasting system for a wide range of industries, and may be applied to forecasting systems for goods as well as services. Nevertheless, the particular system described in this specification is well suited to providing electricity demand forecasts on an hourly or daily basis based on historical weather and electricity demand and weather forecast data downloaded from the client's computer.

That the invention improves over the drawbacks of conventional forecasting systems and accomplishes the advantages described above will become apparent from the following detailed description of the exemplary embodiments and the appended drawings and claims, as well as the attached Exhibits.

DETAILED DESCRIPTION OF THE PREFERRED EMBODIMENTS

The present invention may be embodied in a computer system and business process that provides forecasts as a subscription service. Certain details of an illustrative embodiment of the present invention are documented in the Exhibits filed with this specification, which are incorporated by reference into this specification. The underlying forecasting system is described in U.S. Pat. No. 5,835,902 and commonly-owned U.S. patent application Ser. No. 09/137,265 entitled "Concurrent Learning And Performance Information Processing System" and Ser. No. 08/974,377 entitled "Multi-Kernel Neural Network Concurrent Learning, Monitoring, And Forecasting System," which are each incorporated into this specification by reference.

The computerized forecasting system, known as the "Rapid Learner Client Service" (RLCS) system, may be implemented on the server side in a Compaq model 5500 with dual PENTIUM 300 MHz processors, 500 MB of RAM, and a 59 GB hard drive. This type of server can support approximately 100 clients with hourly or daily electricity demand forecasts. On the client side, the recommended specifications are an IBM-compatible server or workstation with a PENTIUM 300 MHz processor running the WINDOWS NT operating system, version 4.0 or higher, with at least 128 MB of RAM and 15 MB of available hard drive space and a dedicated continuous Internet connection with at least 64K BPS data transmission rate.

The RLCS service typically allows clients to elect to receive hourly-integrated electricity demand forecasts daily, hourly, or once every four hours. Client delivery times are staggered to schedule the processing time for the main RLCS server. Input data typically includes five-day hourly integrated weather forecasts and recent measured weather and electricity demand data. The weather data typically includes only temperature, although humidity, wind direction and strength, luminocity, dew point and other data may be provided. The forecasted output value is usually a one-day, two-day, or five-day hourly electricity demand forecast. However, other input, output, and schedule options may be implemented to meet client needs.

Figure 1:
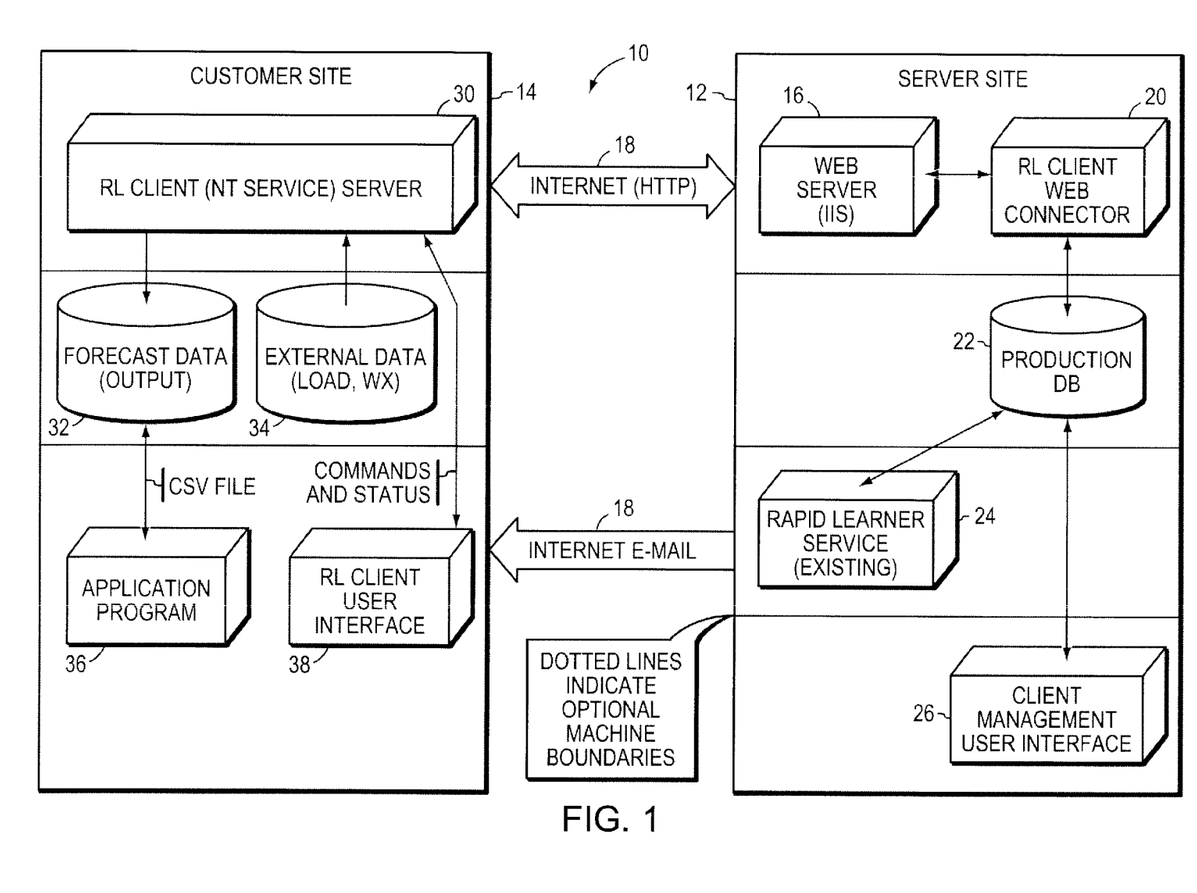
FIG. 1 is a functional block diagram illustrating an automatic data extraction, error correction and forecasting system.

FIG. 1 is a functional block diagram illustrating the RLCS system 10, which includes a server site 12 and one or more (preferably up to one hundred) customer sites, represented by the customer site 14. The server site 12 includes a web server 16 that interacts with the customer site 14 by way of a communication network, such as the Internet 18. The web server 16 automatically and periodically contacts the customer site 14 and downloads a predefined input data file, typically including weather forecast data for a projected period and actual weather and electricity demand data for a recent historical period. For example, the input data file may include the most recent five-day weather forecast data for the customer's geographic region and actual weather and electricity demand for the preceding day. Alternatively, the customer site 14 may contact the server site 12 to initiate the process.

A web connector 20 provides an interface for integrating the web server 12 with the remainder of the server site 12. In particular, the web connector 20 allows the web server 16 to periodically enter the input data download from the customer site 14 into a production database 22. The rapid learner service application program 24 (also called the "kernel") then forecasts the output values, typically a one-day, two-day or five-day hourly integrated electricity demand forecast for one or more delivery points, based on the input data. The forecast is then returned to the customer site 14 by way of Internet e-mail or through a client application. In some applications, the client application may be configured to log into the RLCS system 10 to obtain the forecast at a predefined time. The web server 12 also includes a client management user interface 26, which allows a user, such as a program designer or maintenance technician, to access and control the operation of the web server 12.

A The customer site 14 typically includes a client server 30 (e.g., WINDOWS NT server) that can be directly accessed by the web server 16. The client server 30 interacts with two databases, a forecast database 32 for forecast data and an external database 34 for input data. The customer site 14 also includes an application program 36 for manipulating the databases, such as EXCEL sold by Microsoft Corporation of Redmond Washington. The customer site 14 also includes a client user interface 38, which allows users to access and control the operation of the web server 16.

Figure 2:
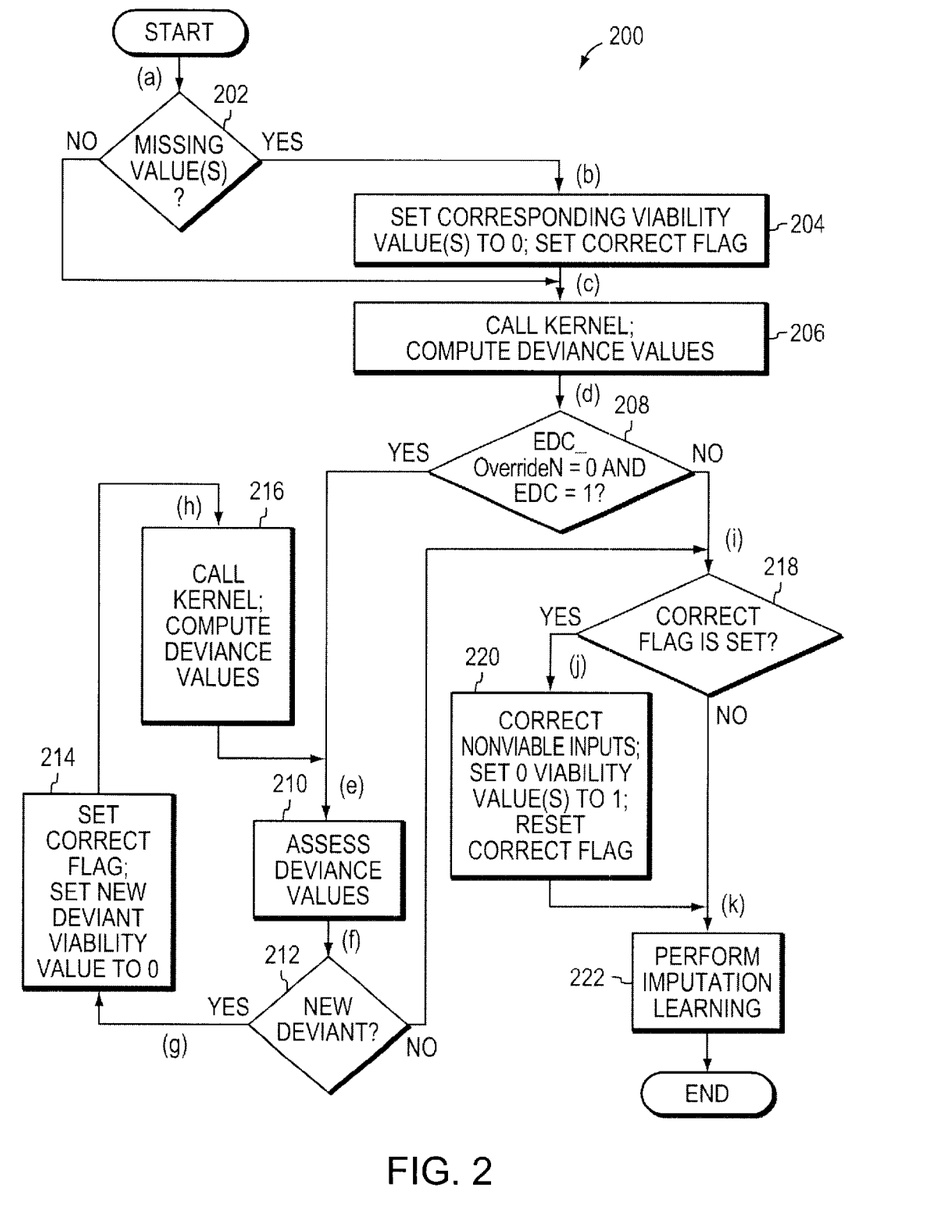
FIG. 2 is diagram illustrating a error correction technique for use in the automatic data extraction, error correction and forecasting system of FIG. 1.

FIG. 2 is diagram illustrating an error correction technique implemented by the RLCS system 10 shown in FIG. 1. In step 202, the RLCS system 10 inspects a recently-received input data file to determine whether any of the data values are missing. If there are data values missing, the "YES" branch is followed to step 204, in which the RLCS system 10 sets a viability value to zero for each missing value. Setting the viability value to zero indicates that the corresponding data value will be given no weight in the forecasting portion of the computation. That is, although replacement data values are imputed for missing input data values, the imputed values are not used in the forecasting portion of the computation. Only valid input data values are used in the forecasting portion of the computation.

Step 204 and the "NO" branch from step 202 are followed by step 206, in which the RLCS system 10 calls the kernel 24, which computes deviance values for the input data values. Step 206 is followed by step 208, in which the RLCS system 10 determines whether a deviance value override flag is disabled (i.e., turned off) and if the user selected error detection and correction. That is, the RLCS system 10 detects deviant values if (1) the user has selected Error Detection and Correction (i.e., EDC=1), and (2) a certain binary variable (i.e., EDC_OverrideN in the flowchart) is 0. If these conditions are met, the "YES" branch is followed to step 210, in which the RLCS system 10 checks the deviance values for the input data. Step 210 is followed by step 212, in which the RLCS system 10 determines whether any of the data values are above a predefined threshold indicating that the associated input value is deviant. If there is a deviant input value, the "YES" branch is followed to step 214, in which the RLCS system 10 sets a correct flag and also sets the viability value for a selected one of the deviant input values to zero. Step 214 is followed by step 216, in which the RLCS system 10 again calls the kernel 24 to compute the deviance values for the input data. The RLCS system 10 thus loops through steps 210 to 216 until the viability value has been set to zero for all deviant input values in the input data. The iterative process of 210 to 216 prevents one deviant value from causing other non-deviant input valued from appearing deviant (i.e., by excluding the deviant input value from the computation of the deviance values in future iterations of the loop).

The "NO" branches from steps 208 and 212 are followed by step 218, in which the RLCS system 10 determines whether the correct flag is set. If the correct flag is set, the "YES" branch is followed to step 220, in which the RLCS system 10 replaces the deviant input values with imputed values computed by the kernel 24. Step 220 and the "NO" branch from step 218 are followed by step 222, in which the RLCS system 10 performs imputation learning (i.e., updates the connection weights of the kernel 24 based on the most recent input data). This marks the end of the end of the error correction and detection phase of the forecasting cycle.

The forecasting cycle then continues by calling the kernel 24 to perform forecast learning and forecast prediction. In addition, the forecasting cycle may implemented in the following order: error detection and correction, forecast learning, forecast prediction, and then imputation learning. The RLCS system 10 may also compute accuracy statistics and transmit the forecast results and the accuracy statistics to the customer site 14.

Rapid Learner™ Error Detection and Correction

Overview. The term "imputing," borrowed from the biometrics field, means replacing deviant and/or missing measurement values with estimated values. The more common estimation term "prediction" might be used to describe imputing as well. "Prediction" is a misnomer for imputing, however, because the "pre" implies that eventually the values being estimated will be actually observed, while bad or missing input measurements may never be observed. For other estimation settings such as forecasting and risk assessment, "prediction" is a more suitable term. Within this specification, "imputing" means replacing current values as necessary and "prediction" means forecasting future values. A good choice for a term that subsumes both meanings would be "estimation."

In typical biomedical applications, historical databases are gathered first and imputing is performed as necessary next. Then, once bad input values have been imputed (by "scrubbing" the database), correlational data analysis is performed in order to identify correlates such as risk factors for disease. Typical biometric imputing methods include first using a portion of a database with complete data to obtain regression-based estimation functions and then using the functions to obtain the imputed values. The independent variables for these estimation functions typically are restricted to other current measurement values instead of recent values along with current values.

Rapid Learner imputing differs from biometric imputing in two ways. First, Rapid Learner imputes missing values continuously for all measurements at each time point as they arrive, instead of off-line for all measurements in an entire historical sample. Second, Rapid Learner routinely uses current measurements along with recently obtained measurements as independent variables for imputing. In this second regard, current Rapid Learner applications tend to be more time-series oriented and based on measurement records that are autocorrelated, rather than random-sampling oriented and based on measurement records that are independently and identically distributed. (Indeed, in applications where random-sampling assumptions are valid, Rapid Learner offers little if any added value, because no continuous learning is necessary.)

Rapid Learner imputing includes (a) missing value detection and correction, (b) error detection and correction, and (c) imputation learning. Missing value detection and correction begins by identifying input values that have been user-labeled as missing. Each input measurement field is always checked for presence of a pound (#) sign, which is the standard Rapid Learner missing value code. If the code is present, then the missing input value becomes corrected by replacing it with the imputed value.

In the current Rapid Learner implementation, once missing values have been corrected they are used as plausible independent variables and plausible measurement feature components. This means that they contribute to estimation and learning as if they were valid measurements. Treating missing values as plausible may be less than ideal because they are artificially generated. As a result, to the extent that missing values exist estimates and learning based on them will be artificial as well.

The Rapid Learner kernel is equipped to treat missing values differently by disregarding them if they are not plausible during estimation and learning. The mechanism for dealing with implausible input measurements is based on so-called "plausibility" variables, one of which exists for each measurement input to the Rapid Learner transducer, and "viability" values, one of which exists for each input to the Rapid Learner kernel. Plausibility and viability values, which can range from 0 to 1 inclusive, are designed to reflect missing value status: a value of 0 indicates that the corresponding measurement or feature should be ignored for estimation or learning, while a value of 1 indicates that it should be fully incorporated into estimation or learning. Fully utilizing the plausibility and viability functionality that has been designed into Rapid Learner results in properly ignoring input values that are missing or deviant. However, this functionality need not be fully implemented in all systems. In fact, it may be beneficial to test the system for various applications on a case-by-case basis to assess the extent to which utilizing plausibility and viability variables are beneficial. Faster processing and less maintenance may be achieved by eliminating this functionality for systems that do not benefit from it.

Although the currently implemented Rapid Learner imputing approach may be less than ideal in theory, it may be best in practice, for two reasons. First and foremost, the effects on learning from an imputed measurement value tend to be small, because (a) the imputed value is a learned (conditional) mean, and (b) learning depends on differences between actual values and mean values rather than on actual values alone. Second, using more sophisticated missing value imputing methods such as tracking and managing plausibility values result in reduced Rapid Learner efficiency. The best eventual choice for Rapid Learner imputing for a particular application may be made based on empirical comparisons of alternative approaches. In general, the applications without this functionality are expected to perform nearly as well as alternatives overall, if not better in some cases.

Error detection and correction involves first identifying deviant input values and replacing them, if necessary, with Rapid Learner imputed values. Rapid Learner identifies an input value as deviant by assessing its "deviance" value, which is the difference between its observed value to its imputed value. If one input value is deviant then its deviance value will have a high magnitude, because its observed value will be much higher or lower than its imputed value. However, other nondeviant measurements may produce high deviance values as well, because their imputed values will be affected by the deviant input value. These other high deviance values, in turn, pose the potential problem of wrongly replacing values of apparently but not actually deviant values.

Rapid Learner avoids this potential problem by using the following sequential process. First, Rapid Learner computes the imputed value of each input measurement. Next, it assesses each input measurement value by computing its standardized deviance value, which is its deviance value divided by the root mean square of its prior deviance values. Next, if the largest standardized deviance value's magnitude does not exceed a user-specified cutoff value (6 is the default value), then the imputing process ends. Otherwise, Rapid Learner replaces the deviant input value with its imputed value and it continues the imputing process. Continuing the process includes (a) recomputing imputed values as well as standardized deviance values after correcting the deviant value, (b) reassessing them against the cutoff value, (c) replacing remaining input values that are deviant accordingly, and then (d) continuing the process if necessary. In this way Rapid Learner can detect and correct one or more truly deviant input values, while avoiding the replacement of input values that are apparently but not actually deviant.

While any number of missing values at a given time point can be corrected by a single imputing call to the Rapid Learner kernel, each deviant input value that Rapid Learner identifies as an input error requires a separate call to the kernel. As a result, missing value correction is a relatively fast process, while error detection and correction can take time, especially if many input measurements are deviant. The resulting potential time loss is sufficiently large that it may be beneficial to offer error detection and correction as an option, thus allowing users to manage speed-accuracy tradeoff manually.

Detecting and correcting deviant inputs necessarily produces a tradeoff between two types of decision errors: type I—accidentally correcting measurements that are not deviant, and type II—accidentally ignoring truly deviant measurements. Type II errors will be minimized insofar is the cutoff value is high enough to produce low expected correction frequencies. On the other hand, type I errors will be minimized insofar as the cutoff value is low. The default cutoff value of 6 is designed to be a compromise that will minimize both types of error. One basis for choosing this cutoff and quantifying the tradeoff comes from a standard statistical theory result, which implies that standardized deviance values will be (asymptotically, under certain tangible assumptions) distributed as standardized normal deviates if input measurements are not deviant. On that basis, the probability of a type I error based on a cutoff value of 6 is less than 1 in a billion.

The probability of type II errors depends on the distribution of standardized deviance values if indeed measurements come from a deviant process. For example, suppose that Rapid Learner has learned that electricity demand input values at noon have a mean value of 1,500 megawatts (mw) with a prediction standard error of 30 mw. In that case, if Rapid Learner computes a predicted value of 1,500 mw for a given input load, then the default upper cutoff value for deviance will be 1,680 mw (1,680=1500+6×30). If input values were to abruptly change to deviant values with a mean of 1,880 mw and a standard deviation of 100, then expected deviance values would be 2 standard deviations above the cutoff value (2=(1,880−1,680)/100). In that case, the Type II error probability of being incorrectly at or below that cutoff value would be about 0.025.

In practice, decisions must often be made as to whether a particular deviant value reflects something transitory that should be corrected or something new that should be learned. These decisions are generally difficult to make. For example, an end-user of Rapid Learner forecasts may not be aware that mean demand is about to change from about 1,500 mw to 1,900 mw because a new steel plant is about to begin operations. In that case, the end-user and Rapid Learner will be faced with the dilemma of deciding whether or not the new input values were deviant. If Rapid Learner error detection and correction were functioning as outlined above, then when demand changed in this way a problem would arise. From that point onward, Rapid Learner would "correct" each "deviant" input value, produce poor forecasts, and learn nothing about from the new loads that have been "corrected." This is an example of a practical type I error problem that doesn't fit the theoretical type I analysis presented earlier.

As one solution to the type I error problem, Rapid Learner includes an option that allows end-users to override error detection and correction, in the event that they know beforehand of imminent changes such as abrupt changes in electricity demand. If users select this option then they must supply a binary override variable at the end of each measurement record. If the override variable has a value of 1, then error detection and correction will not be performed at that time point. Otherwise, error detection and correction will proceed in the usual way. As an example of override usage, suppose that a user knows that electricity demand will suddenly and permanently increase by a substantial amount, beginning tomorrow. Then the user should set the override value to 1 beginning tomorrow and keep it at 1 until Rapid Learner has learned the new mean load value. This will take about 4 learning block lengths of time if the learning factor is 1.0, during which about $15/16$ of all learning impact will be concentrated ($15/16=1−½−¼−⅛−1/16$).

Imputation learning involves updating imputing function learned parameters, including the following: (a) imputing function means, (b) imputing function variances, (c) imputing function connection weights, and (d) error variances that are used to compute standardized deviance values. As mentioned earlier, the current Rapid Learner version updates imputing function learned parameters by using corrected measurement values as if they were plausible. However, corrected measurement values are not used to update error variances, because otherwise error variances would become artificially smaller each time a corrected value was used to compute it. (Reason: since corrected values are the same as their imputed values, corresponding deviance values will be 0. As a result, updating an error variance value by incorporating the (squared) deviance value of 0 would have an error-variance reduction effect.)

Rapid Learner detects missing values first so that, if they exist, deviance values for error detection will not be distorted by them. Rapid Learner also coordinates missing value detection, error detection, correction, and imputation learning in order to avoid unnecessary, time-consuming calls to the imputing kernel. In particular, Rapid Learner performs all imputing operations except imputation learning first in a way that (a) avoids any unnecessary kernel or deviance computations, and (b) ensures that deviance values will be computed as appropriate for imputation learning, which is performed last.

FIG. 2. Error Detection and Correction Flow Chart

The imputing operation sequence is shown in FIG. 2. Missing values are detected first along path (a). If they exist, then path (b) is followed, the viability values are set to 0, and the correct flag is set. The viability values are set to 0 so that when the kernel is called next, missing values will not figure into calculating other variables' imputed values during the kernel call. These other values, which will subsequently be used for error detection and/or correction as well as imputation learning, would otherwise be distorted. The correct flag is set in order to provide for missing value correction later in the process.

Proceeding along path (c), Rapid Learner next calls the kernel and computes deviance values, whether or not missing values have been detected. If missing values have been detected at this point, imputed values that may be used later for error detection will not be distorted by them, because their corresponding viability values have been set to 0. Whether or not missing values have not been detected, this kernel call and these deviance calculations will prepare for later error detection and/or imputation learning.

Proceeding along path (d) in FIG. 2, Rapid Learner next decides whether or not to perform error detection. Rapid Learner detects deviant values if (1) the user has selected Error Detection and Correction (i.e., EDC=1), and (2) a certain binary variable (i.e., EDC_OverrideN in the flowchart) is 0. This binary variable, which may change from time point to time point, serves several functions. First, if the user has selected the manual EDC override option, the user supplies the binary value from time point to time point, thus providing for no error detection and correction during acute measurement changes that the user can identify beforehand. Second, if the user has not selected the manual EDC override option, Rapid Learner sets EDC_OverrideN to 1 at every time point. Finally, Rapid Learner sets EDC_OverrideN to 1 throughout one or more of the first steady-state time points in order to avoid a certain error detection bind, which is described in the next example.

Suppose that a deviant input value had occurred in the last measurement record that Rapid Learner processed prior to beginning steady-state operation. In that case, the corresponding imputed value during the first steady-state trial would be that same deviant value, since (a) the initial mean would be set to that value at that time, and (b) the regression weights for imputing that value from all other input variables would be 0 at that time. Furthermore, the imputed standardized score for that variable at that time point would be 0, because the imputed value would be the same as the initial mean value and their difference will consequently be 0. As a result, after the kernel had updated imputation learning at the end of the first steady-state trial, the regression weights for imputing that value from all other input variables would still be 0. Thus, Rapid Learner would be in the same bind during the second steady-state trial. Furthermore, the bind would perpetuate in all remaining steady-state trials, unless Rapid Learner had provisions for avoiding it.

Rapid Learner avoids the bind by setting EDC_OverrideN to 1 during at least the first steady-state trial. (The user has the option to set EDC_OverrideN to 1 for more than one trial as well—the default number of trials is 5.) This gives Rapid Learner time to learn non-zero imputing regression weights, thus avoiding the bind. Even so, it is possible that the bind will exist anyway, for example, if input values are identical and deviant until the first trial when EDC_OverrideN=0. However, this contingency is highly unlikely, especially if the user is aware that the potential bind exists. The bind can always be avoided by ensuring that preliminary trials are not deviant.

If error detection is required, Rapid Learner proceeds along path (e) and begins error detection by assessing deviance values and identifying the variable with the highest deviance value. Proceeding along path (f), Rapid Learner establishes whether or not a new deviant has been found by comparing the highest deviance value's magnitude to a user-supplied cutoff value (the default value is 6). If this value not exceeded, then error detection ceases, and Rapid Learner proceeds along path (i). Otherwise, Rapid Learner proceeds along path (g).

Proceeding along path (g), Rapid Learner sets the correct flag in order to provide for correction later in the process. Rapid Learner also sets the new deviant variable's viability value is to 0, so that the deviant value will not distort future calculations of imputed values. Next, proceeding along path (h), Rapid Learner calls the kernel in order to obtain new deviance values. Rapid Learner then loops along paths (e) through (h) until it no longer finds new deviant values.

Once no new deviant values have been found, Rapid Learner proceeds along path (i) and checks the Correct flag. If the flag has been set, Rapid Learner corrects non-viable inputs by replacing them with their imputed values. Rapid Learner then prepares for imputing at the next time point by setting 0 viability values to 1 and resetting the Correct flag.

Finally, proceeds along path (k) and performs imputation learning. As mentioned earlier imputation learning involves updating error variances for only viable input measurements. Imputation learning also involves updating kernel learned parameters, including feature means and connection weights. At that juncture, Rapid Learner has completed all imputing steps for the current time point.

Accuracy Statistics

The use and interpretation of the output accuracy statistics of Rapid Learner™ are set forth below. Each term in the upper case below has a corresponding entry marked by an asterisk in a spreadsheet and a corresponding entry listed alphabetically in the Glossary.

BASIC DAILY FORECAST SERVICE (BDFS) ACCURACY STATISTICS: a standard suite of accuracy measures, appropriate for Rapid Learner and other forecasts, for which the following data are available:
  1. ACTUAL VALUES are available for a range of consecutive days.
  2. One or more ACTUAL VALUES are available daily.
  3. The number of daily ACTUAL VALUES is the same over all days.
  4. The daily ACTUAL VALUES are consistently ordered within each day, in that each first available actual daily value was measured at the same time of day, each second available value was measured at the same time of day but after the first actual value, and so on.

5. Each ACTUAL VALUES may optionally be excluded from accuracy statistic computations, by setting its corresponding RETROSPECTIVE EXCLUSIONS value to 0. However, a distinct INPUT FIELD must be available for each actual value.

6. A binary RETROSPECTIVE EXCLUSIONS indicator variable (0=include, 1=exclude) is available for each actual value.

7. One or more FORECAST VALUES are generated for each ACTUAL VALUE during each of one or more 24 hour periods before which the actual value was observed.

8. The number of FORECAST VALUES is fixed over all ACTUAL VALUES.

9. The available FORECAST VALUES for each ACTUAL VALUE are consistently ordered in that each first available forecast value for any actual value was generated most recently, each second available forecast value was generated the second most recently, and so on.

10. Available FORECAST VALUES may also be arranged by the time of day when they were generated.

11. The number of generation times of day is the same as the number of FORECAST VALUES available for each actual value.

12. For any given generated UPDATE TIME of any given day, the forecasts generated at that time may optionally be excluded from accuracy statistic computations, by setting its corresponding PROSPECTIVE EXCLUSIONS value to 0. However, a distinct INPUT FIELD must be available for each FORECAST VALUE.

13. A binary PROSPECTIVE EXCLUSIONS indicator variable (0=include, 1=exclude) is available for each FORECAST VALUE.

ACCOUNT NUMBER: For accuracy statistics generated by an active Rapid Learner customer, the customer's account number for which ACTUAL VALUES and FORECAST VALUES are available on a range of FORECAST DAYS.

DAYS BEGINNING: the first FORECAST DAY for which actual values as well as forecast values for them are available.

DAYS ENDING: the last FORECAST DAY for which actual values as well as forecast values for them are available.

NUMBER OF TIME POINTS PER DAY: number of available ACTUAL VALUES per day.

PROSPECTIVE STATISTICS: statistics that use the forecast value generation time as a reference and compare FORECAST VALUES measured at that time to corresponding ACTUAL VALUES that are observed in the future (i.e., prospectively). These statistics are useful for breaking accuracy down by actual days and actual times of day at which forecasts were made. For example, forecasts made at 3 a.m. may be less accurate than forecasts made at 9 a.m. due to input values being more sporadic earlier in the morning. Prospective statistics are a natural concern for energy dispatchers who are concerned with balancing load a fixed t into the future. For example, a dispatcher who is responsible for balancing load six hours into the future will be concerned about prospective accuracy six hours after forecasts have been generated.

RETROSPECTIVE STATISTICS: statistics that use the ACTUAL VALUE measurement time as a reference and compare actual values measured at that time to corresponding forecasts that were generated previously (i.e., retrospectively). These statistics are useful for breaking accuracy down by actual days and actual times of day for which forecasts were made. For example, retrospective statistics will indicate if actual values at or near on-peak usage hours are forecast more or less accurately than actual values at off-peak usage hours. Retrospective statistics are also useful for comparing accuracy of forecasts made more recently relative to accuracy of forecasts made less recently. Retrospective accuracy is a natural concern for an energy schedulers who are concerned about balancing load at particular times of day. For example, a scheduler who is responsible for meeting peak demand will be concerned about retrospective accuracy at peak demand hours.

ERRORS: PERCENTAGE or ABSOLUTE DEVIATION measures of deviance between actual and forecast values.

PERCENT: ERRORS computed as 100 times the ABSOLUTE DEVIATION between any given actual value and its forecast value, divided by the actual value.

ABSOLUTE DEVIATION: ERRORS computed as the absolute value of the difference between any given actual value and its forecast value.

MEANS: WEIGHTED or UNWEIGHTED averages. All MEANS routinely exclude terms for which corresponding PROSPECTIVE EXCLUSIONS or RETROSPECTIVE EXCLUSIONS value are 1.

WEIGHTED: means that are weighted sums of ERRORS, with the weight for each error value being the its actual value divided by the sum of all actual values over which the weighted mean is calculated.

UNWEIGHTED: means that are simple averages of ERRORS.

FORECAST DAY NUMBER: Rapid Learner produces one of several forecast lengths ranging from 24 for the next day ("one-day forecasts") to 24 for each of the next 10 days ("10-day forecasts"). For an x-day forecast, The FORECAST DAY NUMBER ranges from 1, in which case accuracy statistics will be compared for the first 24 hours after forecasts have been generated, to x, in which case accuracy statistics will be compared for the last 24 hours after forecasts have been generated.

AVERAGED: summary statistics computed by averaging all statistics that are BROKEN DOWN BY UPDATE. Averages include only ERROR terms having corresponding RETROSPECTIVE EXCLUSIONS and PROSPECTIVE EXCLUSIONS values that are not 1.

BROKEN DOWN BY UPDATE: ERROR and MEAN ERROR statistics that are computed for a given UPDATE NUMBER.

NUMBER OF UPDATES PER DAY: number of UPDATE TIMES OF DAY at which FORECAST VALUES are generated.

UPDATE TIMES OF DAY: each update time of day is an integer between 1 and the NUMBER OF TIME POINTS PER DAY and distinct from all other update times of day.

Input Data Including Actual, Forecast, and Exclusions Arrays

ACCURACY STATISTICS INPUT DATA: one ACTUAL VALUES ARRAY in the Actuals spread sheet, one FORECAST VALUES FOR UPDATE NUMBER* array for each forecast number in each corresponding ForecastsU* spreadsheets, one PROSPECTIVE EXCLUSIONS array in the ExclusionsP spreadsheet, and one RETROSPECTIVE EXCLUSIONS array in the ExclusionsR spreadsheet.

ACTUAL VALUES ARRAY: a NUMBER OF DAYS by NUMBER OF TIME POINTS PER DAY array, each containing its corresponding ACTUAL VALUE.

DAY: a column of day labels with the DAYS BEGINNING day label at the top and the DAYS ENDING day label at the bottom.

TIME OF DAY: a row of daytime labels from one to the NUMBER OF TIME POINTS PER DAY.

INPUT VALUES BY DAY AND TIME OF DAY: a NUMBER OF DAYS by NUMBER OF TIME POINTS PER DAY array, with each containing its corresponding ACTUAL VALUE, FORECAST VALUE, or RETROSPECTIVE EXCLUSION VALUE, depending on spreadsheet.

ARRAY OF FORECAST VALUES FOR UPDATE NUMBER*: a NUMBER OF DAYS by NUMBER OF TIME POINTS PER DAY array, each containing its corresponding FORECAST VALUE.

PROSPECTIVE EXCLUSIONS: binary indicator variable (0=include, 1=exclude) values, one for each DAY, FORECAST TIME OF DAY combination. If a prospective exclusions value is 1 then all ERRORS using forecasts that were generated on its corresponding day and time of day will be excluded from accuracy statistics computations.

PROSPECTIVE EXCLUSIONS ARRAY: a NUMBER OF DAYS by NUMBER OF UPDATES PER DAY array, each containing its corresponding PROSPECTIVE EXCLUSIONS value.

RETROSPECTIVE EXCLUSIONS: binary indicator variable (0=include, 1=exclude) values, one for each ACTUAL VALUE. If a retrospective exclusions value is 1 then all ERRORS using its corresponding actual value will be excluded from accuracy statistics computations.

RETROSPECTIVE EXCLUSIONS ARRAY: a NUMBER OF DAYS by NUMBER OF TIME POINTS PER DAY array, each containing its corresponding RETROSPECTIVE EXCLUSIONS value.

Output accuracy statistics data, except first-order and second-order statistics. The items in the following list are ordered below according to their appearance in the ErrorsU* spreadsheets and the ErrorAverages spreadsheet. The list includes only terms that were not introduced in the above Input data list. All output statistics appear in this list except first-order and second-order statistics, which are described in the next section. As with the above input list, each term in upper case below has a corresponding entry marked by an asterisk in the spreadsheets and a corresponding entry listed alphabetically in the Glossary.

BROKEN DOWN BY UPDATE NUMBER*: Each spreadsheet labeled ErrorsU* contains errors broken down by its corresponding update number.

One such spreadsheet is provided for each NUMBER OF UPDATES PER DAY. In the prospective case, the results in ErrorsU1 are comparisons between FORECAST VALUES that were generated at UPDATE TIME POINT 1 and their corresponding ACTUAL VALUES; the results in ErrorsU2 are comparisons between FORECAST VALUES that were generated at UPDATE TIME POINT 2 and their corresponding ACTUAL VALUES; and so on. In the retrospective case, the results in ErrorsU1 compare ACTUAL VALUES with those that were forecast most recently; the results in ErrorsU2 compare ACTUAL VALUES with those that were forecast second most recently; and so on.

MEANS BY TIME: a row of WEIGHTED MEANS or UNWEIGHTED MEANS, one for each TIME OF DAY, each of which the average of all ERRORS over all DAYS. These statistics are either BROKEN DOWN BY UPDATE NUMBER, as in the ErrorsU* spreadsheets, or averages of all such update number statistics, as in the ErrorAverages spreadsheet.

MEAN: a WEIGHTED MEAN or an UNWEIGHTED MEAN, computed as the average over all ERRORS for its corresponding UPDATE NUMBER. This statistic is either BROKEN DOWN BY UPDATE NUMBER, as in the ErrorsU* spreadsheets, or the average of all such update number statistics, as in the ErrorAverages spreadsheet.

MEANS BY DAY: a column of WEIGHTED MEANS or UNWEIGHTED MEANS, one for each DAY within its corresponding UPDATE NUMBER, each of which is the average of all ERRORS over all TIMES OF DAY. These statistics are either BROKEN DOWN BY UPDATE NUMBER, as in the ErrorsU* spreadsheets, or averages of all such update number statistics, as in the ErrorAverages spreadsheet.

ERROR VALUES BY DAY AND TIME: a NUMBER OF DAYS by NUMBER OF TIME POINTS PER DAY array, each containing its corresponding ERRORS value. These statistics are either BROKEN DOWN BY UPDATE NUMBER, as in the ErrorsU* spreadsheets, or averages of all such update number statistics, as in the ErrorAverages spreadsheet.

Output first-order and second-order statistics. The items in the following list are ordered below according to their appearance in the ErrorsU* spreadsheets and the ErrorAverages spreadsheet. The list includes first-order and second-order statistics along with related definitions unless they were already introduced in the above Input data and Output data lists. As with the above two lists, each term in upper case below has a corresponding entry marked by an asterisk in the spreadsheets and a corresponding entry listed alphabetically in the Glossary.

FIRST-ORDER AND SECOND-ORDER ACCURACY STATISTICS BY DAY: Each spreadsheet labeled ErrorsU* contains FIRST-ORDER AND SECOND-ORDER ACCURACY STATISTICS by day, broken down by its corresponding update number. In addition, the spreadsheet labeled ErrorAverages contains the average among these update statistics. All such statistics on any given spreadsheet appear in the four right-most columns of the spreadsheet. The first column contains STANDARD ERRORS BY DAY, the second column contains TOLERANCE BAND RATIOS BY DAY, the third column contains BIAS BY DAY values, and the fourth column contains BIAS NORMALIZED BY DAY values.

STANDARD ERRORS BY DAY: Each spreadsheet labeled ErrorsU* contains STANDARD ERROR statistics by day, broken down by its corresponding update number. In addition, the spreadsheet labeled ErrorAverages contains the average among these update statistics. All such statistics on any given spreadsheet appear in a suitably labeled column on the right side of the spreadsheet.

TOLERANCE BAND RATIOS BY DAY: Each spreadsheet labeled ErrorsU* contains TOLERANCE BAND RATIO statistics by day, broken down by its corresponding update number. In addition, the spreadsheet labeled ErrorAverages contains the average among these update statistics. All such statistics on any given spreadsheet appear in a suitably labeled column on the right side of the spreadsheet.

BIAS BY DAY: Each spreadsheet labeled ErrorsU* contains BIAS statistics by day, broken down by its corresponding update number. In addition, the spreadsheet labeled ErrorAverages contains the average among these update statistics. All such statistics on any given spreadsheet appear in a suitably labeled column on the right side of the spreadsheet.

BIAS NORMALIZED BY DAY: Each spreadsheet labeled ErrorsU* contains BIAS NORMALIZED statistics by day, broken down by its corresponding update number. In addition, the spreadsheet labeled ErrorAverages contains the average among these update statistics. All such statistics on any given spreadsheet appear in a suitably labeled column on the right side of the spreadsheet.

FIRST-ORDER AND SECOND-ORDER ACCURACY STATISTICS BY TIME: Each spreadsheet labeled ErrorsU* contains FIRST-ORDER AND SECOND-ORDER ACCURACY STATISTICS by time, broken down by its corresponding update number. In addition, the spreadsheet labeled ErrorAverages contains the average among these update statistics. All such statistics on any given spreadsheet appear in the four bottom-most rows of the spreadsheet. The first row contains STANDARD ERRORS BY TIME, the second column contains TOLERANCE BAND RATIOS BY TIME, the third column contains BIAS BY TIME values, and the fourth column contains BIAS NORMALIZED BY TIME values.

STANDARD ERRORS BY TIME: Each spreadsheet labeled ErrorsU* contains STANDARD ERROR statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

TOLERANCE BAND RATIOS BY TIME: Each spreadsheet labeled ErrorsU* contains TOLERANCE BAND RATIO statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

BIAS BY TIME: Each spreadsheet labeled ErrorsU* contains BIAS statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

BIAS NORMALIZED BY TIME: Each spreadsheet labeled ErrorsU* contains BIAS NORMALIZED statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

FIRST-ORDER AND SECOND-ORDER ACCURACY STATISTICS: Each spreadsheet labeled ErrorsU* contains first-order and second-order accuracy statistics broken down by its corresponding update number. In addition, the spreadsheet labeled ErrorAverages contains the average among these update statistics. All such statistics on any given spreadsheet appear in the four bottom-most and right-most cells of the spreadsheet. Among these, the upper left cell contains the STANDARD ERROR value, the second cell contains the TOLERANCE BAND value, the third cell contains the BIAS value, and the fourth column contains the BIAS NORMALIZED value. These are called first-order and second-order accuracy statistics, because they are all derived from sample first-order moments (i.e., actual means and forecast means) and second-order moments (i.e., actual mean squares, forecast mean squares, and actual-forecast mean cross-products).

STANDARD ERROR: Each spreadsheet labeled ErrorsU* contains a standard error statistic broken down by its corresponding update number. In addition, the spreadsheet labeled ErrorAverages contains the average among these update statistics. This statistic appears in a suitably labeled cell at the bottom-most and right-most portion of the spreadsheet. This standard error, like all other "broken down" standard errors, is t root (WEIGHTED or UNWEIGHTED) mean of squared differences between actual and corresponding forecast values.

TOLERANCE BAND RATIO: Each spreadsheet labeled ErrorsU* contains a tolerance band ratio statistic broken down by its corresponding update number. In addition, the spreadsheet labeled ErrorAverages contains the average among these update statistics. This statistic appears in a suitably labeled cell at the bottom-most and right-most portion of the spreadsheet. This tolerance band ratio, like all other "broken down" tolerance band ratios, is the ratio of the standard error to the standard deviation of actual values. Alternatively, it is the square root of the squared product-moment correlation coefficient between actual and forecast values.

BIAS: Each spreadsheet labeled ErrorsU* contains a bias statistic broken down by its corresponding update number. In addition, the spreadsheet labeled ErrorAverages contains the average among these update statistics. This statistic appears in a suitably labeled cell at the bottom-most and right-most portion of the spreadsheet. This bias value, like all other "broken down" bias values, is the (WEIGHTED or UNWEIGHTED) mean among differences between actual and forecast values (actual minus forecast).

BIAS NORMALIZED: Each spreadsheet labeled ErrorsU* contains a bias normalized statistic broken down by its corresponding update number. In addition, the spreadsheet labeled ErrorAverages contains the average among these update statistics. This statistic appears in a suitably labeled cell at the bottom-most and right-most portion of the spreadsheet. This bias normalized value, like all other "broken down" bias normalized values, is the bias value divided by the (WEIGHTED or UNWEIGHTED) standard deviation among difference values.

An Example. xxx

Glossary. Each entry that is listed in alphabetical order below is listed above in order of appearance on the input and output spreadsheets.

ABSOLUTE DEVIATION: ERRORS computed as the absolute value of the difference between any given actual value and its forecast value.

ACCOUNT NUMBER: For accuracy statistics generated by an active Rapid Learner customer, the customer's account number for which ACTUAL VALUES and FORECAST VALUES are available on a range of FORECAST DAYS.

ACCURACY STATISTICS INPUT DATA: one ACTUAL VALUES ARRAY in the Actuals spread sheet, one FORECAST VALUES FOR UPDATE NUMBER* array for each forecast number in each corresponding ForecastsU* spreadsheets, one PROSPECTIVE EXCLUSIONS array in the ExclusionsP spreadsheet, and one RETROSPECTIVE EXCLUSIONS array in the ExclusionsR spreadsheet.

ACTUAL VALUES ARRAY: a NUMBER OF DAYS by NUMBER OF TIME POINTS PER DAY array, each containing its corresponding ACTUAL VALUE.

DAY: a column of day labels with the DAYS BEGINNING day label at the top and the DAYS ENDING day label at the bottom.

ARRAY OF FORECAST VALUES FOR UPDATE NUMBER*: a NUMBER OF DAYS by NUMBER OF TIME POINTS PER DAY array, each containing its corresponding FORECAST VALUE.

AVERAGED: summary statistics computed by averaging all statistics that are BROKEN DOWN BY UPDATE. Averages include only ERROR terms having corresponding RETROSPECTIVE EXCLUSIONS and PROSPECTIVE EXCLUSIONS values that are not 1.

BASIC DAILY FORECAST SERVICE (BDFS) ACCURACY STATISTICS: a standard suite of accuracy measures, appropriate for Rapid Learner and other forecasts, for which the following data are available:

1. ACTUAL VALUES are available for a range of consecutive days.
2. One or more ACTUAL VALUES are available daily.
3. The number of daily ACTUAL VALUES is the same over all days.
4. The daily ACTUAL VALUES are consistently ordered within each day, in that each first available actual daily value was measured at the same time of day, each second available value was measured at the same time of day but after the first actual value, and so on.
5. Each ACTUAL VALUES may optionally be excluded from accuracy statistic computations, by setting its corresponding RETROSPECTIVE EXCLUSIONS value to 0. However, a distinct INPUT FIELD must be available for each actual value.
6. A binary RETROSPECTIVE EXCLUSIONS indicator variable (0=include, 1=exclude) is available for each actual value.
7. One or more FORECAST VALUES are generated for each ACTUAL VALUE during each of one or more 24 hour periods before which the actual value was observed.
8. The number of FORECAST VALUES is fixed over all ACTUAL VALUES.
9. The available FORECAST VALUES for each ACTUAL VALUE are consistently ordered in that each first available forecast value for any actual value was generated most recently, each second available forecast value was generated the second most recently, and so on.
10. Available FORECAST VALUES may also be arranged by the time of day when they were generated.
11. The number of generation times of day is the same as the number of FORECAST VALUES available for each actual value.
12. For any given generated UPDATE TIME of any given day, the forecasts generated at that time may optionally be excluded from accuracy statistic computations, by setting its corresponding PROSPECTIVE EXCLUSIONS value to 0. However, a distinct INPUT FIELD must be available for each FORECAST VALUE.
13. A binary PROSPECTIVE EXCLUSIONS indicator variable (0=include, 1=exclude) is available for each FORECAST VALUE.

BIAS: Each spreadsheet labeled ErrorsU* contains a bias statistic broken down by its corresponding update number. In addition, the spreadsheet labeled ErrorAverages contains the average among these update statistics. This statistic appears in a suitably labeled cell at the bottom-most and right-most portion of the spreadsheet. This bias value, like all other "broken down" bias values, is the (WEIGHTED or UNWEIGHTED) mean among differences between actual and forecast values (actual minus forecast).

BIAS BY DAY: Each spreadsheet labeled ErrorsU* contains BIAS statistics by day, broken down by its corresponding update number. In addition, the spreadsheet labeled ErrorAverages contains the average among these update statistics. All such statistics on any given spreadsheet appear in a suitably labeled column on the right side of the spreadsheet.

BIAS BY TIME: Each spreadsheet labeled ErrorsU* contains BIAS statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

BIAS NORMALIZED: Each spreadsheet labeled ErrorsU* contains a bias normalized statistic broken down by its corresponding update number. In addition, the spreadsheet labeled ErrorAverages contains the average among these update statistics. This statistic appears in a suitably labeled cell at the bottom-most and right-most portion of the spreadsheet. This bias normalized value, like all other "broken down" bias normalized values, is the bias value divided by the (WEIGHTED or UNWEIGHTED) standard deviation among difference values.

BIAS NORMALIZED BY DAY: Each spreadsheet labeled ErrorsU* contains BIAS NORMALIZED statistics by day, broken down by its corresponding update number. In addition, the spreadsheet labeled ErrorAverages contains the average among these update statistics. All such statistics on any given spreadsheet appear in a suitably labeled column on the right side of the spreadsheet.

BIAS NORMALIZED BY TIME: Each spreadsheet labeled ErrorsU* contains BIAS NORMALIZED statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

BROKEN DOWN BY UPDATE: ERROR and MEAN ERROR statistics that are computed for a given UPDATE NUMBER.

BROKEN DOWN BY UPDATE NUMBER*: Each spreadsheet labeled ErrorsU* contains errors broken down by its corresponding update number. One such spreadsheet is provided for each NUMBER OF UPDATES PER DAY. In the prospective case, the results in ErrorsU1 are comparisons between FORECAST VALUES that were generated at UPDATE TIME POINT 1 and their corresponding ACTUAL VALUES; the results in ErrorsU2 are comparisons between FORECAST VALUES that were generated at UPDATE TIME POINT 2 and their corresponding ACTUAL VALUES; and so on. In the retrospective case, the results in ErrorsU1 compare ACTUAL VALUES with those that were forecast most recently; the results in ErrorsU2 compare ACTUAL VALUES with those that were forecast second most recently; and so on.

DAY: a column of day labels with the DAYS BEGINNING day label at the top and the DAYS ENDING day label at the bottom.

DAYS BEGINNING: the first FORECAST DAY for which actual values as well as forecast values for them are available.

DAYS ENDING: the last FORECAST DAY for which actual values as well as forecast values for them are available.

ERRORS: PERCENTAGE or ABSOLUTE DEVIATION measures of deviance between actual and forecast values.

ERROR VALUES BY DAY AND TIME: a NUMBER OF DAYS by NUMBER OF TIME POINTS PER DAY array, each containing its corresponding ERRORS value. These statistics are either BROKEN DOWN BY UPDATE NUMBER, as in the ErrorsU* spreadsheets, or averages of all such update number statistics, as in the ErrorAverages spreadsheet.

FIRST-ORDER AND SECOND-ORDER ACCURACY STATISTICS: Each spreadsheet labeled ErrorsU* contains first-order and second-order accuracy statistics broken down by its corresponding update number. In addition, the spreadsheet labeled ErrorAverages contains the average among these update statistics. All such statistics on any given spreadsheet appear in the four bottom-most and right-most cells of the spreadsheet. Among these, the upper left cell contains the STANDARD ERROR value, the second cell contains the TOLERANCE BAND value, the third cell contains the BIAS value, and the fourth column contains the BIAS NORMALIZED value. These are called first-order and second-order accuracy statistics, because they are all derived from sample first-order moments (i.e., actual means and forecast means) and second-order moments (i.e., actual mean squares, forecast mean squares, and actual-forecast mean cross-products).

FIRST-ORDER AND SECOND-ORDER ACCURACY STATISTICS BY DAY: Each spreadsheet labeled ErrorsU* contains FIRST-ORDER AND SECOND-ORDER ACCURACY STATISTICS by day, broken down by its corresponding update number. In addition, the spreadsheet labeled ErrorAverages contains the average among these update statistics. All such statistics on any given spreadsheet appear in the four right-most columns of the spreadsheet. The first column contains STANDARD ERRORS BY DAY, the second column contains TOLERANCE BAND RATIOS BY DAY, the third column contains BIAS BY DAY values, and the fourth column contains BIAS NORMALIZED BY DAY values.

FIRST-ORDER AND SECOND-ORDER ACCURACY STATISTICS BY TIME: Each spreadsheet labeled ErrorsU* contains FIRST-ORDER AND SECOND-ORDER ACCURACY STATISTICS by time, broken down by its corresponding update number. In addition, the spreadsheet labeled ErrorAverages contains the average among these update statistics. All such statistics on any given spreadsheet appear in the four bottom-most rows of the spreadsheet. The first row contains STANDARD ERRORS BY TIME, the second column contains TOLERANCE BAND RATIOS BY TIME, the third column contains BIAS BY TIME values, and the fourth column contains BIAS NORMALIZED BY TIME values.

FORECAST DAY NUMBER: Rapid Learner produces one of several forecast lengths ranging from 24 for the next day ("one-day forecasts") to 24 for each of the next 10 days ("10-day forecasts"). For an x-day forecast, The FORECAST DAY NUMBER ranges from 1, in which case accuracy statistics will be compared for the first 24 hours after forecasts have been generated, to x, in which case accuracy statistics will be compared for the last 24 hours after forecasts have been generated.

INPUT VALUES BY DAY AND TIME OF DAY: a NUMBER OF DAYS by NUMBER OF TIME POINTS PER DAY array, with each containing its corresponding ACTUAL VALUE, FORECAST VALUE, or RETROSPECTIVE EXCLUSION VALUE, depending on spreadsheet.

MEAN: a WEIGHTED MEAN or an UNWEIGHTED MEAN, computed as the average over all ERRORS for its corresponding UPDATE NUMBER. This statistic is either BROKEN DOWN BY UPDATE NUMBER, as in the ErrorsU* spreadsheets, or the average of all such update number statistics, as in the ErrorAverages spreadsheet.

MEANS: WEIGHTED or UNWEIGHTED averages. All MEANS routinely exclude terms for which corresponding PROSPECTIVE EXCLUSIONS or RETROSPECTIVE EXCLUSIONS value are 1.

MEANS BY DAY: a column of WEIGHTED MEANS or UNWEIGHTED MEANS, one for each DAY within its corresponding UPDATE NUMBER, each of which is the average of all ERRORS over all TIMES OF DAY. These statistics are either BROKEN DOWN BY UPDATE NUMBER, as in the ErrorsU* spreadsheets, or averages of all such update number statistics, as in the ErrorAverages spreadsheet.

MEANS BY TIME: a row of WEIGHTED MEANS or UNWEIGHTED MEANS, one for each TIME OF DAY, each of which the average of all ERRORS over all DAYS. These statistics are either BROKEN DOWN BY UPDATE NUMBER, as in the ErrorsU* spreadsheets, or averages of all such update number statistics, as in the ErrorAverages spreadsheet.

NUMBER OF TIME POINTS PER DAY: number of available ACTUAL VALUES per day.

NUMBER OF UPDATES PER DAY: number of UPDATE TIMES OF DAY at which FORECAST VALUES are generated.

PERCENT: ERRORS computed as 100 times the ABSOLUTE DEVIATION between any given actual value and its forecast value, divided by the actual value.

PROSPECTIVE EXCLUSIONS: binary indicator variable (0=include, 1=exclude) values, one for each DAY, FORECAST TIME OF DAY combination. If a prospective exclusions value is 1 then all ERRORS using forecasts that were generated on its corresponding day and time of day will be excluded from accuracy statistics computations.

PROSPECTIVE EXCLUSIONS ARRAY: a NUMBER OF DAYS by NUMBER OF UPDATES PER DAY array, each containing its corresponding PROSPECTIVE EXCLUSIONS value.

PROSPECTIVE STATISTICS: statistics that use the forecast value generation time as a reference and compare FORECAST VALUES measured at that time to corresponding ACTUAL VALUES that are observed in the future (i.e., prospectively). These statistics are useful for breaking accuracy down by actual days and actual times of day at which forecasts were made. For example, forecasts made at 3 a.m. may be less accurate than forecasts made at 9 a.m. due to input values being more sporadic earlier in the morning. Prospective statistics are a natural concern for energy dispatchers who are concerned with balancing load a fixed time into the future. For example, a dispatcher who is responsible for balancing load six hours into the future will be concerned about prospective accuracy six hours after forecasts have been generated.

RETROSPECTIVE EXCLUSIONS: binary indicator variable (0=include, 1=exclude) values, one for each ACTUAL VALUE. If a retrospective exclusions value is 1 then all ERRORS using its corresponding actual value will be excluded from accuracy statistics computations.

RETROSPECTIVE EXCLUSIONS ARRAY: a NUMBER OF DAYS by NUMBER OF TIME POINTS PER DAY array, each containing its corresponding RETROSPECTIVE EXCLUSIONS value.

RETROSPECTIVE STATISTICS: statistics that use the ACTUAL VALUE measurement time as a reference and compare actual values measured at that time to corresponding forecasts that were generated previously (i.e., retrospectively). These statistics are useful for breaking accuracy down by actual days and actual times of day for which forecasts were made. For example, retrospective statistics will indicate if actual values at or near on-peak usage hours are forecast more or less accurately than actual values at off-peak usage hours. Retrospective statistics are also useful for comparing accuracy of forecasts made more recently relative to accuracy of forecasts made less recently. Retrospective accuracy is a natural concern for an energy schedulers who are concerned about balancing load at particular times of day. For example, a scheduler who is responsible for meeting peak demand will be concerned about retrospective accuracy at peak demand hours.

STANDARD ERROR: Each spreadsheet labeled ErrorsU* contains a standard error statistic broken down by its corresponding update number. In addition, the spreadsheet labeled ErrorAverages contains the average among these update statistics. This statistic appears in a suitably labeled cell at the bottom-most and right-most portion of the spreadsheet. This standard error, like all other "broken down" standard errors, is the root (WEIGHTED or UNWEIGHTED) mean of squared differences between actual and corresponding forecast values.

STANDARD ERRORS BY DAY: Each spreadsheet labeled ErrorsU* contains STANDARD ERROR statistics by day, broken down by its corresponding update number. In addition, the spreadsheet labeled ErrorAverages contains the average among these update statistics. All such statistics on any given spreadsheet appear in a suitably labeled column on the right side of the spreadsheet.

STANDARD ERRORS BY TIME: Each spreadsheet labeled ErrorsU* contains STANDARD ERROR statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

TIME OF DAY: a row of daytime labels from one to the NUMBER OF TIME POINTS PER DAY.

TOLERANCE BAND RATIO: Each spreadsheet labeled ErrorsU* contains a tolerance band ratio statistic broken down by its corresponding update number. In addition, the spreadsheet labeled ErrorAverages contains the average among these update statistics. This statistic appears in a suitably labeled cell at the bottom-most and right-most portion of the spreadsheet. This tolerance band ratio, like all other "broken down" tolerance band ratios, is the ratio of the standard error to the standard deviation of actual values. Alternatively, it is the square root of the squared product-moment correlation coefficient between actual and forecast values.

TOLERANCE BAND RATIOS BY DAY: Each spreadsheet labeled ErrorsU* contains TOLERANCE BAND RATIO statistics by day, broken down by its corresponding update number. In addition, the spreadsheet labeled ErrorAverages contains the average among these update statistics. All such statistics on any given spreadsheet appear in a suitably labeled column on the right side of the spreadsheet.

TOLERANCE BAND RATIOS BY TIME: Each spreadsheet labeled ErrorsU* contains TOLERANCE BAND RATIO statistics by time, broken down by its corresponding update number. In addition, the spreadsheet labeled ErrorAverages contains the average among these update statistics. All such statistics on any given spreadsheet appear in a suitably labeled row at the bottom of the spreadsheet.

UNWEIGHTED: means that are simple averages of ERRORS.

UPDATE TIMES OF DAY: each update time of day is an integer between 1 and the NUMBER OF TIME POINTS PER DAY and distinct from all other update times of day.

UPDATE TIMES OF DAY: each update time of day is an integer between 1 and the NUMBER OF TIME POINTS PER DAY and distinct from all other update times of day.

WEIGHTED: means that are weighted sums of ERRORS, with the weight for each error value being the its actual value divided by the sum of all actual values over which the weighted mean is calculated.

It should be understood that the foregoing pertains only to the preferred embodiments of the present invention, and that numerous changes may be made to the embodiments described herein without departing from the spirit and scope of the invention.

What is claimed is:

1. A method of forecasting in a computer-based forecasting system comprising the method steps of:

receiving a set of input data from a subscriber's computer;

downloading the input data to a remote server;

checking the input data for missing or deviant input values;

correcting for errors by imputing values for the missing or the deviant input values;

computing a forecast of output values based on the set of the input data; and downloading the output values to the subscriber's computer.

2. The method of claim 1, wherein the checking step comprises the method steps of:

computing deviance values from the set of input data;

determining if an override option and error correction and detection option have been enabled;

if the override option and the error correction and detection option have been enabled, determining errors in the deviance values;

correcting errors in the deviance values to create a corrected set of input data; and performing imputation learning using the corrected set of input data.

3. The method of claim 2, wherein the correcting step comprises the method steps of:

assessing the deviance values;

identifying a deviant deviance value which exceeds a predefined threshold;

excluding the deviant deviance value and setting the deviant deviance value to a non-viable deviant value;

re-computing the deviance values; and repeating the accessing, identifying and excluding steps until all of the deviance values are below the predefined threshold.

4. The method of claim 2, wherein the step of performing imputation learning includes the steps of:
- updating imputing function means;
- imputing function variances;
- imputing function connection weights; and
- updating error variances used to compute the deviance values.

5. The method of claim 1, wherein:
the checking step further comprises the steps of:
- identifying a missing value from the set of input data;
- disregarding the missing value and setting the missing value as a non-viable input;
- imputing a value for such missing value;
- correcting the missing value with the imputed value; and
- performing imputation learning using the corrected missing value and the set of input data.

6. The method of claim 5, wherein the step of performing imputation learning includes the steps of:
- updating error variances for only viable input data; and
- updating kernel learned parameters including feature means and connection weights.

7. The method of claim 6, wherein:
the connection weights define elements of an inverse covariance matrix; and the step of imputing includes the steps of:
- automatically updating the connection weights in a covariance matrix corresponding to the inverse covariance matrix; and
- inverting the updated covariance matrix.

8. The method of claim 6, wherein:
the connection specifications include connection weights defining elements of an inverse covariance matrix; and
the method step of imputing comprises the step of:
- automatically updating the connection weights of the inverted covariance matrix.

9. A method for detecting and selectively correcting errors in a set of input data for use in a computer forecasting system comprising the steps of:
- receiving a value for each input data of the set of input data;
- identifying a missing value from the set of input data;
- disregarding the missing value and setting such missing value as a non-viable input;
- computing deviance values from the set of input data;
- correcting the non-viable inputs;
- performing imputation learning using the corrected non-viable inputs and the set of input data; and
- computing a forecast based on the set of input data.

10. The method of claim 9, further comprising the method steps of:
- determining if an override option and error correction and detection option have been enabled; and
- if the override option and the error correction detection option have been enabled performing,
  - assessing deviance values,
  - identifying a deviant deviance value which exceeds a predefined threshold,
  - excluding the deviant deviance value and setting the deviant deviance value to a non-viable deviant value;
  - re-computing the deviance values, and
  - repeating the assessing, identifying and excluding steps until all of the deviance values are below the predefined threshold.

11. The method of claim 10, further comprising the method steps of:
- correcting the non-viable inputs; and
- performing imputation learning using the corrected non-viable inputs and the set of input data.

12. A computer-based forecasting system comprising:
- means for receiving a set of input data from a subscriber's computer;
- means for downloading the input data to a remote server;
- means for checking the input data for missing or deviant input values;
- means for correcting for errors by imputing values for the missing or the deviant input values;
- means computing a forecast of output values based on the set of input data; and
- means for downloading the output values to the subscriber's computer.

* * * * *